2 Sheets—Sheet 1.

A. M. DOLPH.
Starching-Machine.

No. 8,710. Reissued May 13, 1879.

Attest.

E. R. Hill

Jno. W. Strehli.

Inventor.

Alexander M. Dolph, per Wm. Hubbell Fisher,

Atty

N. PETERS, PHOTO-LITHOGRAPHER, WASHINGTON, D. C.

A. M. DOLPH.

Starching-Machine.

No. 8,710. Reissued May 13, 1879.

Attest.

E. R. Hill.

Jno. W. Strehli.

Inventor.

Alexander M. Dolph per Wm. Hubbell Fisher

Atty

N. PETERS, PHOTO-LITHOGRAPHER, WASHINGTON, D. C.

UNITED STATES PATENT OFFICE.

ALEXANDER M. DOLPH, OF CINCINNATI, OHIO.

IMPROVEMENT IN STARCHING-MACHINES.

Specification forming part of Letters Patent No. 144,071, dated October 28, 1873; Reissue No. 8,710, dated May 13, 1879; application filed October 17, 1878.

*To all whom it may concern:*

Be it known that I, A. M. DOLPH, of Cincinnati, in the county of Hamilton, and in the State of Ohio, have invented certain new and useful Improvements in Starching-Machines; and do hereby declare that the following is a full, clear, and exact description thereof, reference being had to the accompanying drawings, making a part of this specification, in which—

Figure 1:
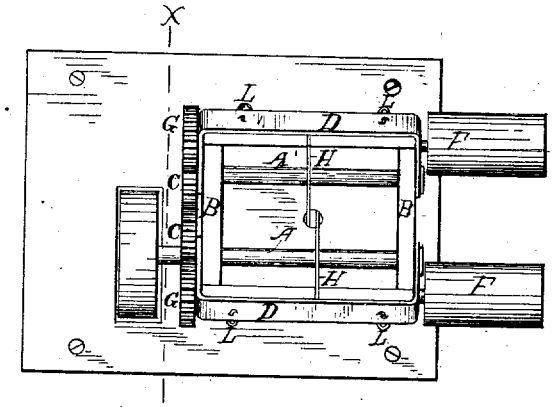
Figure 2:
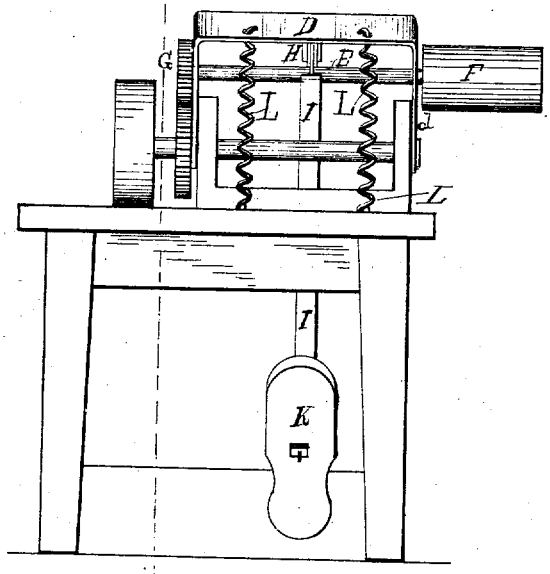
Figure 3:
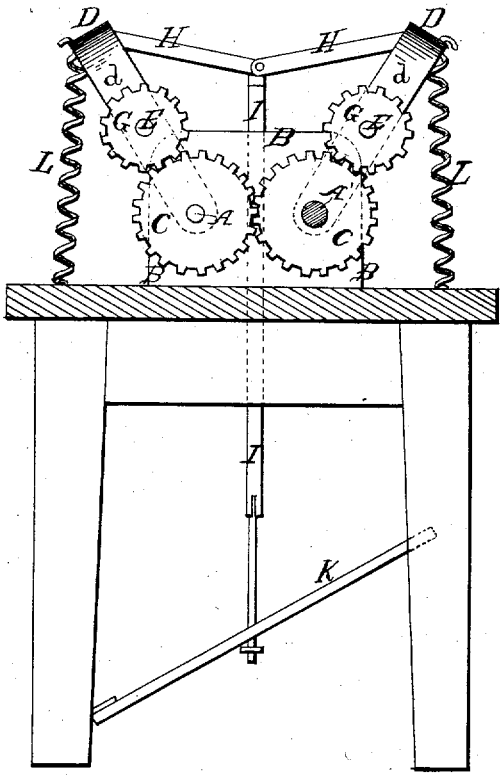

Figure 1 is a plan view of the upper side of my improved apparatus. Fig. 2 is a front elevation of the same, and Fig. 3 is a section upon line X X of Figs. 1 and 2.

Letters of like name and kind refer to like parts in each of the figures.

The design of my invention is to enable operatives in laundries to force the hot starch into and through fabrics, and at the same time to express the surplus starch from the fabrics, and also to perform both operations with uniformity and ease, and without direct application of the hands.

It consists generally in means whereby the pressure-rollers can be rotated, and at the same time be brought together with a desired pressure varying with the will of the operator.

It consists, further, of means whereby, when the pressure by which the rollers were brought together has been withdrawn, the rollers will automatically separate.

In the annexed drawings, A and A′ represent two shafts suitably journaled upon or within a frame, B, and provided upon corresponding ends with gear-wheels C and C, which mesh together, as shown.

Upon the ends of each shaft, outside of its bearings, are pivoted the parallel arms *d* of a frame-bar, D, which extends upward and across, as seen in Fig. 2, and furnishes bearings for a shaft, E, that upon one of its ends is provided with an elastic roller, F, and upon its opposite end with a pinion, G, which meshes with and receives motion from the gear C of the shaft upon which said frame-bar is pivoted.

As thus arranged it will be seen that the compression-rollers F with their frames can be moved toward or from each other without changing the relative positions of their pinions and driving-gear, the pinion of each roller-shaft having a line of motion around the center of its driving-shaft.

Upon each of the frame-bars D, near the longitudinal center of its horizontal portion, is pivoted one end of a bar, H, the opposite end of which is pivoted to or upon the corresponding end of the opposite bar H, and at such pivotal center is attached one end of a rod, I, that from thence extends downward, and is atached to or upon a treadle, K, the arrangement described enabling said frame-bars and the compression-rollers to be moved toward each other by depressing the outer end of said treadle.

One or more springs, L, attached to the outer edge of each frame-bar D, and from thence extending outward and downward to some suitable portion of the frame, draw said frame-bar and its roller outward to the position shown in Figs. 1 and 3, while at the same time it permits said parts to be moved inward by the action of the treadle.

The apparatus is now complete, and operates as follows: The operator takes position within convenient reach of the compression-rollers and the treadle, and placing some of the starched fabric between the said rollers, which are revolved by power, presses upon said treadle until the required degree of pressure is given by said rollers to said fabric, which pressure, while as forcible as may be required, is yielding, so as to permit a greater or less thickness to pass through, and uniform, in that it subjects thick or thin portions of a garment to the same degree of pressure.

Having thus fully set forth the nature and merits of my invention, what I claim as new is—

1. The combination, in a starching-machine, of two separable elastic rolls parallel to each other, devices for driving positively and for automatically separating the said rolls, and a lever whereby they may be brought together with a pressure varying at the will of the operator, as set forth.

2. In combination with a reciprocating framework, the independent separable elastic rollers F, pinions G, and gears C C, substantially as and for the purposes specified.

3. In combination with a reciprocating framework, the elastic rollers F, their pinions G, and the gears C C, substantially as and for the purposes specified.

4. In a starching-machine, the elastic rollers F F, operated by mechanism at one end only, the other ends being left free from gearing or other mechanism, substantially as and for the purposes described.

A. M. DOLPH.

Attest:
WILLIAM A. DAVIDSON,
E. R. HILL.